(12) United States Patent
Giallorenzi et al.

(10) Patent No.: US 7,861,298 B1
(45) Date of Patent: Dec. 28, 2010

(54) SYSTEM AND METHOD FOR PROTECTING AGAINST DENIAL OF SERVICE ATTACKS

(75) Inventors: Thomas R. Giallorenzi, Herriman, UT (US); Johnny M. Harris, Centerville, UT (US); Sam Kingston, Salt Lake City, UT (US); Robert A. Wright, Salt Lake City, UT (US); Larry Thomson, Bountiful, UT (US)

(73) Assignee: L-3 Communications, Corp., New York, NY (US)

( * ) Notice: Subject to any disclaimer, the term of this patent is extended or adjusted under 35 U.S.C. 154(b) by 1126 days.

(21) Appl. No.: 11/529,791

(22) Filed: Sep. 28, 2006

(51) Int. Cl.
*G06F 21/00* (2006.01)

(52) U.S. Cl. .................... 726/22; 726/23; 726/24; 726/25

(58) Field of Classification Search .............. 726/22
See application file for complete search history.

(56) References Cited

U.S. PATENT DOCUMENTS 5,862,452 A * 1/1999 Cudak et al. ................. 725/81
2001/0009025 A1 * 7/2001 Ahonen ....................... 713/161
2004/0023651 A1 * 2/2004 Gollnick et al. .............. 455/423
2006/0217121 A1 * 9/2006 Soliman et al. .............. 455/446

FOREIGN PATENT DOCUMENTS

WO     WO 01/54379     7/2001

OTHER PUBLICATIONS

Guang Yang, Defense against Low-rate TCP-targeted Denial-of-Service Attacks, publication date: 2004, pp. 345-350.*

* cited by examiner

*Primary Examiner*—Nasser Moazzami
*Assistant Examiner*—Ghazal Shehni
(74) *Attorney, Agent, or Firm*—Kirton & McConkie; William T. Ralston

(57) ABSTRACT

A system and method is disclosed for protecting a receiver configured to receive a plurality of contemporaneous spread spectrum signal bursts from a denial of service attack. The method includes the operation of detecting a burst transmission that includes a random burst number. The burst transmission can be analyzed to determine a denial of service statistic based on the random burst number. The burst transmission is processed when the denial of service statistic is within a predetermined threshold.

26 Claims, 4 Drawing Sheets

SYSTEM AND METHOD FOR PROTECTING AGAINST DENIAL OF SERVICE ATTACKS

BACKGROUND

A common problem in modern ad-hoc wireless communications networks is that individual nodes need to recognize each other's existence, and possibly each other's locations, to be able to join together to form a network. In military communications systems fast and covert new node identification and recognition means can help prevent friendly fire incidents. Once a network is established, new nodes often need to join the existing network. The nodes need a way to do this without compromising their own security, or the security of the network they are joining. Additionally, an established network typically uses a method of discovering the existence of another disjoint network that has migrated into communication range, so that a cross-link can be established between the networks to form a larger network. This process of nodes "discovering" each other is called node discovery.

There are many ways that node discovery can be performed. A good node discovery scheme for an encrypted or secret communications network has a number of properties, including permitting very fast and reliable network entry, being covert, secure and jam proof, as well as having a range that exceeds the network itself. One procedure used to accommodate these desired properties is to spread the carrier signal to form a spread spectrum signal.

Spread spectrum techniques have proven useful in a variety of communications applications, including cellular telephones, wireless networks, and military communications. One advantage provided by spread spectrum techniques is the ability to build a transmitter which is difficult for an unauthorized user to detect.

Wireless spread spectrum systems operate by using a relatively large amount of spectrum bandwidth to communicate their signals. The large bandwidth is consumed by spread spectrum encoding the message data using a pseudonoise code. The two most common types of spread spectrum transmission are frequency hopping, where the pseudonoise code is used to pseudo randomly change the transmission frequency on a periodic basis, and direct sequence, where the pseudonoise code is used to modulate the transmit signal at a relatively high rate compared to the underlying message data rate.

In order to detect a spread spectrum transmission, it is generally necessary to know the pseudonoise code beforehand. Furthermore, to extract the message data, it is generally necessary to know the timing of the pseudonoise code. For example, in a direct sequence system, this can be accomplished by knowing the code frequency, also known as the chip rate (rate at which the pseudonoise code advances through its sequence), and the starting time of the pseudonoise code (sometimes referred to as the phase of the code). A signal for which the spread spectrum receiver knows the pseudonoise code, pseudonoise code phase, and pseudonoise code frequency can be referred to as a synchronized signal.

Achieving synchronization with a spread spectrum signal can be difficult, in part due to high pseudonoise code rate (frequency). For example, a relatively low message data rate of 1,000 bits per second might be spread spectrum encoded with a relatively high pseudonoise code rate of 10,000,000 chips per second, where a bit of the pseudonoise code is referred to as a chip. In this example, the ratio of 10,000,000/1,000=10,000 is the processing gain. A spread spectrum receiver for this signal will need to synchronize to the high pseudonoise code rate being used by the transmitter, and hence the spread spectrum receiver requires a factor of 10,000 higher synchronization accuracy than a non spread spectrum system. The difficulty of achieving this synchronization increases as the processing gain increases.

In order to limit the difficulty of synchronizing spread spectrum systems, various techniques have been used. These techniques include the use of very stable oscillators to generate the carrier frequency on which the transmission is centered, the use of very stable clocks to generate the pseudonoise code, and the transmission of special pilot signals or long preambles of known data to aid receiver in synchronization.

Another property of spread spectrum systems is a generally low probability of detection by a user lacking knowledge of the pseudonoise code. This is because the transmitter power of the spread spectrum signal is spread out over a relatively large portion of radio spectrum. By using a high processing gain, it is possible to sufficiently spread the transmitter power out so that the resulting transmission spectral power density is below the noise level within the environment. In general, it is more difficult to detect a spread spectrum signal without knowledge of the pseudonoise code as the processing gain is increased, making the use of high processing gain desirable.

Disrupting transmissions of spread spectrum signals is technically possible. For example, a foe may be able to transmit noise or some other type of signal over the same bandwidth as the spread spectrum signal. The noise may be broadcast at a sufficiently high power that the signal to noise ratio of the transmitted signal is low enough that it becomes difficult to detect the signal out of the noise. However, at sufficiently high processing gains the spread spectrum signal is broadcast over a relatively wide signal bandwidth. The amount of power that would be necessary to broadcast over substantially all of the bandwidth to disrupt the spread spectrum power becomes unfeasible. Thus, a foe may look for other ways to disrupt a spread spectrum signal having a high processing gain.

SUMMARY

A system and method is disclosed for protecting a receiver configured to receive a plurality of contemporaneous spread spectrum signal bursts from a denial of service attack. The method includes the operation of detecting a burst transmission that includes a random burst number. The burst transmission can be analyzed to determine a denial of service statistic based on the random burst number. The burst transmission is processed when the denial of service statistic is within a predetermined threshold.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Despite the difficulty of detecting a spread spectrum signal, detection is still theoretically possible, especially for a technically advanced foe. While detecting, descrambling, and demodulating an encrypted spread spectrum signal is significantly challenging without knowledge of the PN code and encryption method, it may be possible for a foe to record a burst transmission. The burst transmission may then be re-transmitted a plurality of times. This kind of attack is typically called a record and playback denial of service attack. If the foe were to then re-transmit the recorded burst using a plurality of transmitters, it may be possible to disrupt a receiver's hardware and software used to receive legitimate bursts. It may even be possible to sever or otherwise eliminate the viable use of one or more data links. In accordance with one aspect of the invention, it has been recognized that a system and method is needed to reduce of eliminate the effects of a denial of service attack on a wireless spread spectrum receiver.

Figure 1A:
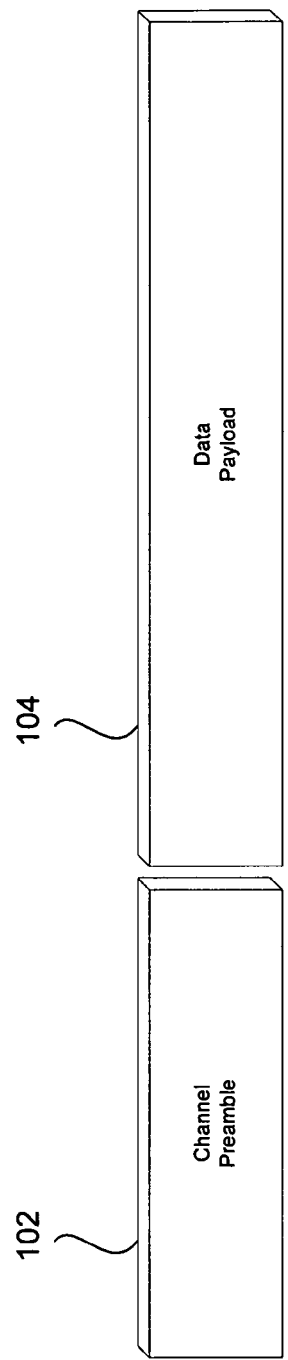
FIG. 1a illustrates a block diagram of a data payload coupled to a burst transmission signal.

In a direct sequence spread spectrum system, a transmitted signal often begins with a known preamble sequence 102, as shown in FIG. 1a. The preamble is typically configured to allow a receiver time to detect a transmission and to synchronize the receiver with the transmitter so that a data payload 104 including a subsequent message following the preamble may be received. If a system receiver is to support multiple users (or multiple ad-hoc network devices) whose transmissions may overlap, then the system receiver will need multiple receive processes (either in hardware or software) running simultaneously. Otherwise, the receiver can only search for one transmission at a time.

These receive processes can be referred to as "burst receivers." The burst receivers can allow multiple contemporaneous signals to be received at one time. The contemporaneous signals can overlap, such as when a second received signal transmission begins before a first received signal transmission ends. However, the two signals can be distinguished by using a sufficient sample rate to differentiate substantially simultaneously received signals. One specialized type of system supporting multiple users is referred to as a spread-aloha type system. The spread-aloha system is described more fully in copending application U.S. application Ser. No. 11/351,464 filed Feb. 10, 2006 which is fully incorporated herein by reference.

Figure 2:
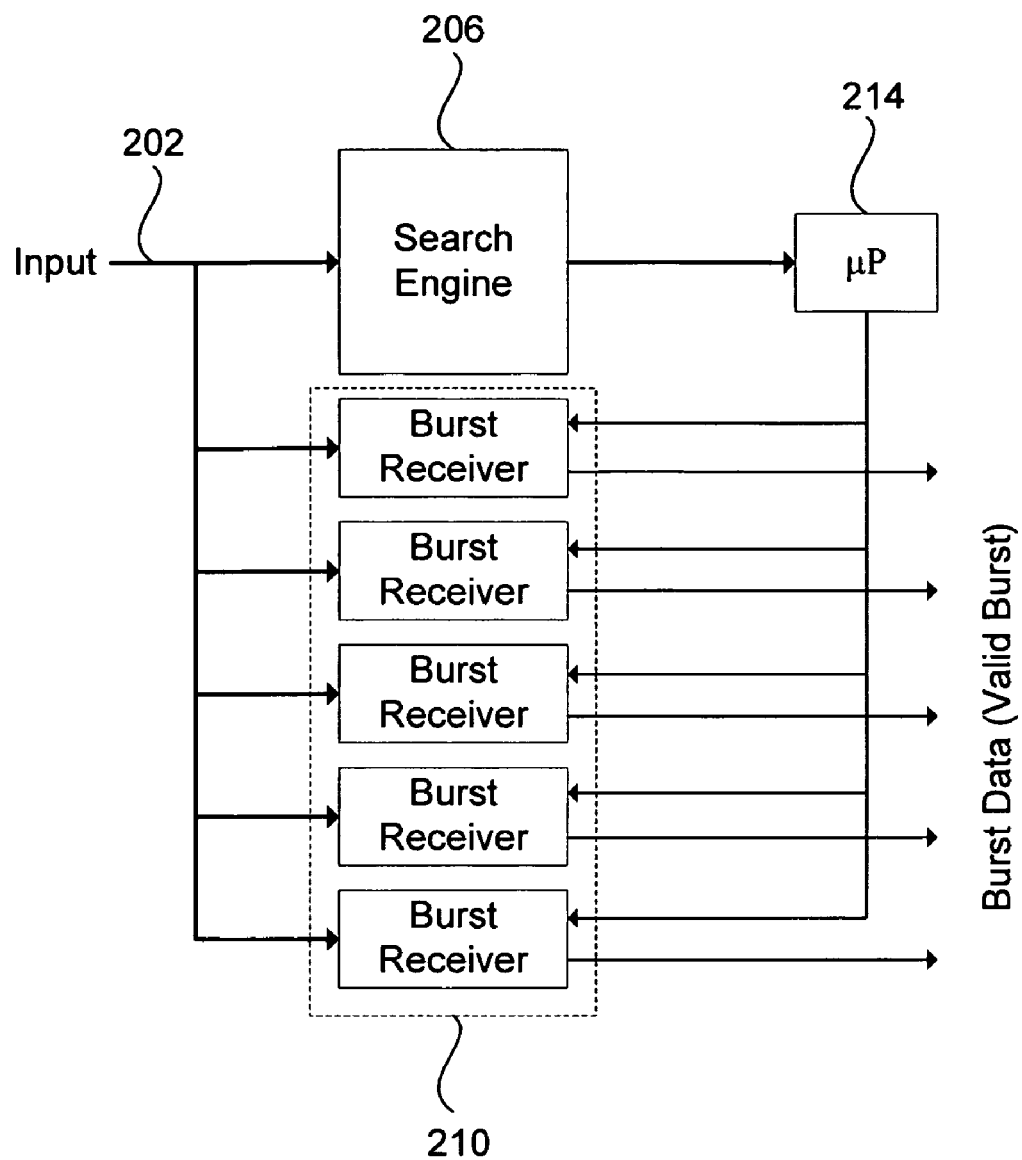
FIG. 2 illustrates a block diagram of a search engine coupled to a plurality of burst receivers in accordance with an embodiment of the invention.

A search engine 202 can be assigned to a plurality of N burst receivers 210, as shown in FIG. 2. The search engine can receive data from an antenna, or a portion of the data from the antenna, such as a particular channel of data. The search engine's job is to continuously search for potential incoming bursts. The search engine can report to a processor 214 information concerning any candidate burst. This information can include the burst's estimated carrier frequency, PN chip frequency and PN chip phase. The processor can then assign one member of the pool of N simultaneous burst receivers to investigate the candidate burst. The processor can report the information to the burst receiver to enable it to acquire the burst. The pool of burst receivers can receive the signals and process the burst transmissions to provide burst data.

An adversary wishing to disrupt a wireless link between a burst transmitter and burst receiver may be able to record a valid transmission and then transmit the recorded signal. This transmission may be perceived by the burst receiver's search engine to be an authorized transmission, and will therefore be assigned to a burst receiver. If the adversary can transmit the same recording many times in a relatively short period of time, the pool of N burst receivers can be exhausted. This leaves few to no burst receivers available to process transmissions from authorized system users. This "record and playback" denial of service attack is potentially serious because various types of jamming transmitters can play many bursts back in rapid succession. The arrival rate of the recorded bursts is potentially hundreds per second. Such a jamming transmitter could be used to rapidly jam communications between nodes in an ad-hoc network.

One potential solution to this problem is to use a low complexity method of identifying unauthorized duplicate transmissions so that transmissions based on a record and playback denial of service attack can be ignored. The low complexity of the identification system can enable a reduced amount of hardware and/or software to be devoted to thwarting a denial of service attack should one occur.

Figure 1B:
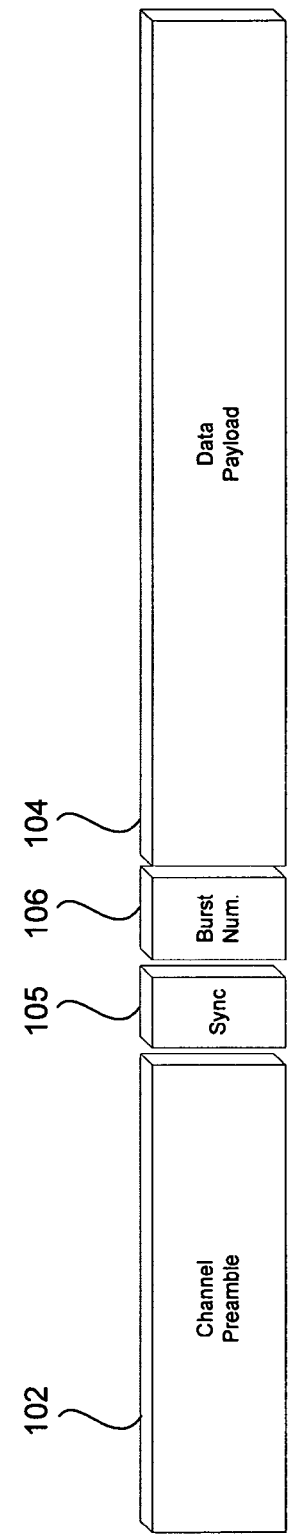
FIG. 1b illustrates a block diagram of a data payload coupled to a burst transmission signal, wherein the data payload includes a burst number in accordance with an embodiment of the invention.

If a record and playback denial of service attack is attempted, all of the unauthorized transmissions arriving at a receiver can have substantially identical preambles 102, as shown in FIG. 1a. Since multiple identical preambles do not necessarily suggest unauthorized transmissions, the receiver can use a mechanism to determine whether such transmissions are authorized. Information can be included in the preamble 102 or data payload 104 section of the transmitted burst that can enable detection of multiple transmitted bursts. For example, in one embodiment a burst number 106 can be included in each burst, as shown in FIG. 1b. The burst number can be a random or pseudo-random number. A pseudo-random number is a number that appears random but is not. Pseudo-random numbers typically exhibit statistical randomness while being generated by an entirely deterministic causal process. The use of a random or psuedo-random number can simplify the design of the burst receiver since the receiver does not necessarily need to know a priori which number will be selected, but it can know the set of valid numbers that may be selected.

Whether the burst number is random or psuedo-random, the number will have a predetermined statistical probability of repeating based on the burst generation process and the potential size of the burst number set. For example, a random selection of a burst number, by a person or device, from a set consisting of the numbers 1 to 100 results in a statistical probability of 1 percent that the burst number will be a certain number, such as 25. The odds of the person or device selecting two consecutive random bursts both having the same burst number, such as 25, are 100*100 or one in ten thousand. The number of persons or devices having access to a burst receiver can effect the probability of a random number being received. As can be appreciated, it is very unlikely that a plurality of persons or devices will select the same random number, especially when the random set is large, such a set having 2^16 numbers. A statistical threshold value can be established for a predetermined burst number range. The statistical threshold can include the range of possible burst numbers and the potential number of simultaneous users. If the burst number is repeated more the statistical threshold, the burst number can be flagged as being a burst sent by a potential record and playback denial of service attack. The flagged bursts can be inhibited from being assigned to a burst receiver or, alternatively, if the burst number is decoded in the burst receiver, further processing of the burst signal can be inhibited. Subsequently detected bursts having the same burst number can be inhibited from being processed in a burst receiver for a predetermined amount of time sufficient to ensure that the denial of service attack is no longer occurring.

Details of the burst number, such as length and placement within the burst signal transmission may vary depending on the particular receiver implementation. In one embodiment, a receiver can include the search engine, as previously disclosed, that can continuously search for incoming preambles. In this embodiment, the search engine is not used to demodulate payload data. Rather, it may simply locate arrivals and estimate their chip timing, chip frequency, and carrier frequency. Upon discovery of a potential burst, the search engine can look ahead in the transmission to identify the burst number 106, as shown in FIG. 1b. To facilitate identification of the burst number, the burst number can be located at the end of the premable 102. The search engine can demodulate and decode the burst number, and if the number is found to be within the statistical threshold over a predetermined amount of time, a member of the pool of burst receivers 210 (FIG. 2) can be assigned to further process the burst transmission. The burst receiver can lock to the discovered burst and decode the payload data 104.

Alternatively, since the burst receiver is designed to demodulate and decode data, it may be preferable to have the burst receiver decode the burst number instead of using the search engine 206, as shown in FIG. 2. If this is done, the entire resources of the burst receiver may not be required. A typical burst receiver is comprised of, among other elements, a matched filter, a multi-user detector for cancelling interfering signals, and a forward error correction decoder. While the matched filter is fairly low in computational complexity, a multi-user detector and forward error correction decoder are substantially greater in computational complexity compared to the matched filter. Determining the burst number without the aid of the multi-user detector and forward error correction decoder can be substantially simpler and require less complex hardware. If the matched filter alone is used for burst number identification, it may be unnecessary to decode the number.

Using only a matched filter correlator to determine the burst number can lower the complexity of the detection, but it can also lead to an increased probability of error. One way to tolerate the higher error probability associated with the low complexity test is to encode the burst number with an error correction code, such as a block forward error correction code. If the low complexity test indicates (without actually decoding the burst number) that the burst is not a duplicate, then the burst signal can be sent to the burst receiver. The burst receiver can then decode the burst number for more positive verification of the burst number. Should it be discovered at this point that an error was made by the low complexity test, and the burst is indeed an unauthorized duplicate, the burst receiver can at this point terminate demodulation of the burst and make the burst receiver's resources available for another transmission. Encoding the burst number with a forward error correction code may be desirable even if a low complexity test is not used.

The actual decision as to whether or not a transmission is authorized might not be made by the processor 214 that performs the test on the burst number. When the burst number is decoded, the result may be provided to a microprocessor configured to run an algorithm useful in determining if bursts are authorized based on the burst number it receives from the decoding process. For example, duplicate burst numbers may be counted during a time window. If the number of occurrences of a given burst number is exceeded in a specified time period, then that burst number can be flagged as being unauthorized. The burst receivers 210 will not be assigned to decode transmissions having that flagged burst number. After a sufficient time period elapses without an excessive number of bursts having the flagged burst number, the burst number can be unflagged and the burst receivers can be subsequently free to decode bursts having that random or pseudo-random burst number. The threshold number of occurrences and the length of the associated time windows can be calculated based on probabilities of authorized users (or ad-hoc network devices) selecting the same burst numbers within the time windows.

Figure 3:
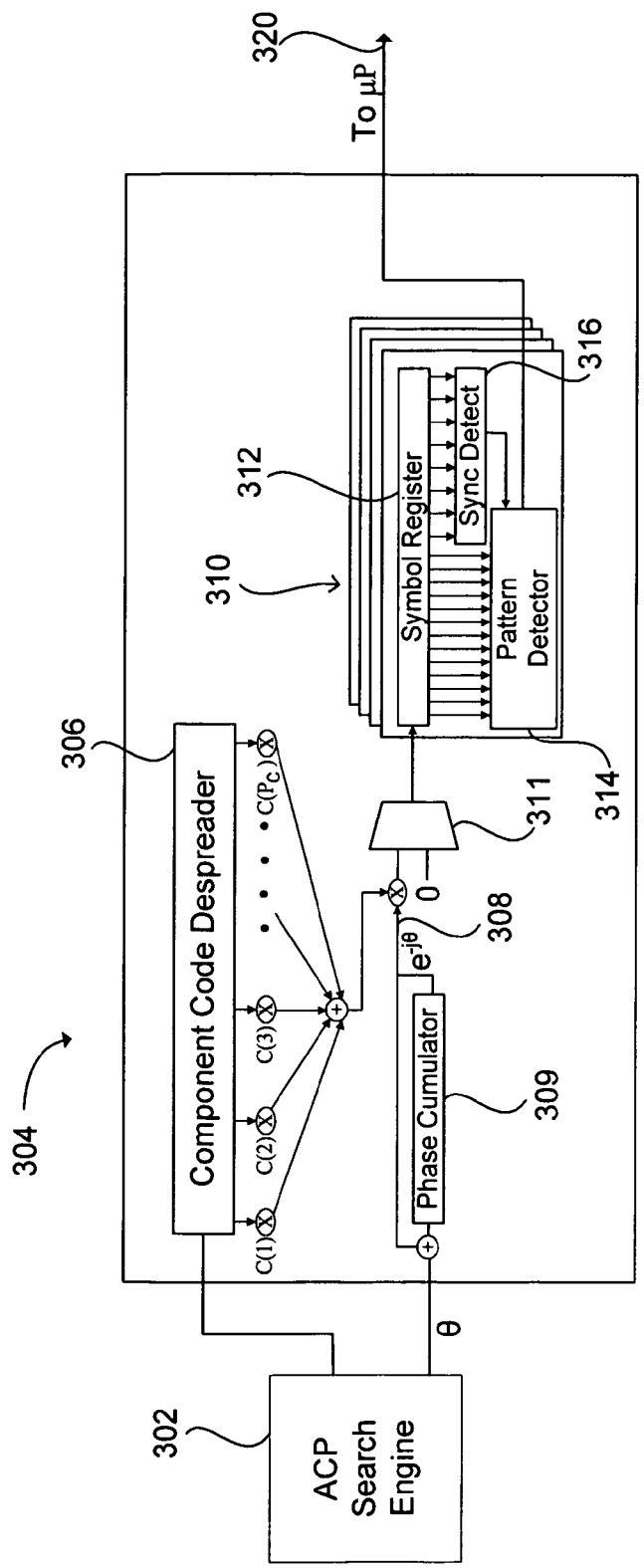
FIG. 3 illustrates an accumulated cross product search engine coupled to a burst number detector in accordance with an embodiment of the invention.

In one embodiment, an accumulated cross product (ACP) search engine 302 can be coupled to a look ahead burst number detector 304, as shown in FIG. 3. The ACP search engine, as described in copending patent application, TNW docket number 24172, which is herein incorporated by reference in its entirety, is configured to detect burst transmissions and output an approximate magnitude and frequency of the detected burst transmission. The magnitude represents the strength of the burst transmission, while the frequency offset is a frequency difference between the received burst transmission and a frequency reference in the receiver.

The ACP search engine 302 can be used to partially despread a spread spectrum signal having a composite code. A composite code is a pseudorandom code comprised of N component codes. For example, a composite code having three layers may be comprised of a component code A of length $P_A$, component code B of length $P_B$, and component code C of length $P_C$. The overall length of the ABC code is $P_A*P_B*P_C$. The use of a composite code having a plurality of component codes provides a significant advantage to the ACP search engine, as disclosed in the TNW docket number 24172 that was previously referenced.

In one embodiment, the ACP search engine can despread the AB layers. Alternatively, the spread spectrum signal can be partially despread at an earlier location in a receiver system and the search engine can receive the partially despread signal. The partially despread signal, which may be sampled at twice the chip rate of the ABC code, can be output from the ACP search engine to the burst number detector 304. The burst number detector can then despread the remaining component or components of the composite code, such as the C code layer in the example in FIG. 3, using the component code despreader 306. The component code despreader can be used to despread a plurality of component codes.

While an ACP search engine 302 is shown, other types of search engines, such as a pseudo noise correlation accumulation search engine (PNCA) can also be used in conjunction with the burst number detector 304. A PNCA search engine can be used to detect incoming bursts. However, the PNCA search engine typically cannot determine a frequency offset of a received signal relative to a receiver frequency reference. Thus, it may be more difficult to detect a burst number in a burst signal detected by a PNCA search engine due to an unknown amount of frequency offset between the burst signal and the receiver frequency reference.

The frequency difference between the signal output from the component code despreader 306 and the receiver frequency reference can be caused by clock imperfections in a transmitter frequency reference and the receiver frequency reference. The frequency difference can also be due to a Doppler shift in the burst transmission due to movement between the transmitter and receiver. The frequency difference can appear to be a rotation in the received signal with respect to the receiver frequency reference when viewed in a Cartesian frame. This rotation can be detected by the ACP search engine. The received signal can be de-rotated 308 by the cumulative phase differences from the ACP search engine 302. The ability of the ACP search engine to determine a frequency offset between the received signal and the receiver frequency reference enables the frequency offset to be substantially removed, allowing data, such as the burst number, to be more easily detected.

The depth of the phase cumulator 309 can be equal to the number of samples per symbol. For example, if the sample rate of the signal is twice the chip rate, the phase angle can be accumulated in the phase cumulator 309 for $2\ P_A{}^*P_B{}^*P_C$ samples, which can equate to one symbol length. The oldest samples in the symbol can then be added to the newest samples from the next symbol, enabling a phase difference for each symbol to be accumulated. Accumulating the phase differences allows noise to be removed over time. Each time a burst transmission is detected by the ACP search engine 302, the potential burst signal can be despread using the component code despreader 306 and de-rotated 308 using the output of the phase cumulator and then sent to one of a plurality of burst number decoders 310. The plurality of burst number decoders enables the burst number detector to receive a plurality of overlapping burst transmissions. The input to the burst number decoder can include logic or a multiplexer 311 configured to allow a signal to enter one of the burst number decoders when a burst transmission is received. In one embodiment, a burst transmission can be assigned to one of the plurality of burst number decoders based on the order of the burst transmission's arrival.

Each burst number decoder 310 can be configured to perform a test on a detected burst to determine whether the random or pseudorandom burst number in the detected burst transmission has been preceded by the same burst number and has thus exceeded a predetermined statistical threshold. The burst number decoder can be configured to enable the burst number to be identified while minimizing hardware and/or software use in the event of a denial of service attack. Minimizing the amount of resources used in detecting a duplicate burst enables a maximum number of duplicate bursts in a denial of service attack to be rejected by the burst number detector while minimizing the overall affect on the system.

In one embodiment, the burst number decoder 310 can include a symbol register 312. The symbol register can be configured to receive a plurality of samples comprising a symbol. The burst decoder can further include a sync detector configured to identify a synchronization signal 105 located within the burst (FIG. 1*b*). The synchronization signal can be a known sequence that allows the sync detector to know when the received signal is synchronized with a receiver frequency reference. When the sync detector identifies the last bit within the sync signal, it can be known that the following symbols represent the burst number. The symbols identifying the burst number can then be sent from the symbol register to the pattern detector 314.

The configuration of the pattern detector 314 can be a relatively complex device including a matched filter, a multi-user detector for canceling interfering signals, a forward error correction (FEC) decoder, and a demodulator. Such a system, however, can be computationally complex, as previously discussed. Alternatively, the complexity of the pattern decoder can be substantially reduced by encoding the burst number with a block FEC code at the transmitter side. For example, the burst number can be a 16 bit number that can be encoded with a rate ¼ block code to produce a 64 bit encoded burst number. Encoding the burst number can provide enough redundancy that a relatively low power signal can be reliably detected, even with substantial noise on the received signal.

Rather than decoding the block code in the pattern detector, a correlator can simply be used to look for a pattern. A carrier lock may not be needed to find the burst number pattern. However, the unlocked signal can include noise, flipped samples relative to the transmitted signals, and rotation between the received signal and the receiver frequency reference.

To overcome these problems, a differential detection scheme can be used. Differential detection provides a comparison between adjacent bits. A differential pattern detector or correlator can determine changes from one symbol to the next to form a differential pattern. The pattern, in the example, provides a difference pattern for each of the 64 symbols in the encoded burst number. The differential pattern for each of the 64 symbols in the encoded burst number can be saved and compared with the differential patterns for subsequently received bursts using a microprocessor 320.

If a statistically improbable number of differential patterns are found to match over a relatively short time, such as three matching patterns received over a 2 second window, burst transmissions having the burst number, and thus the same differential pattern, can be eliminated for a set amount of time. Of course, the actual number of patterns received and the size of the window can vary widely, as previously discussed.

If no matching pattern is found, or the number of matching patterns is within the desired statistical tolerance, the burst can be sent to a burst receiver 210, as shown in FIG. 2. The burst receiver can then decode and demodulate the data on the transmitted burst. If, at this point, it is determined that the burst number detector 304 (FIG. 3) was in error, transmission bursts including the burst number can also be blocked for a set amount of time. Thus, the receiver can act as a backup for the relatively low complexity burst number detector.

Figure 4:
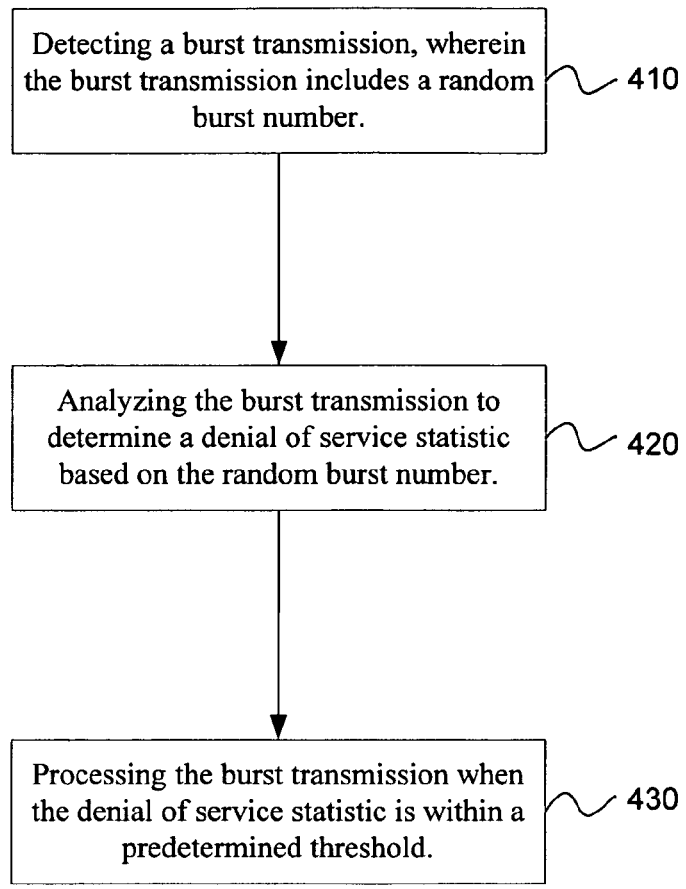
FIG. 4 depicts a flow chart of a method for protecting a receiver configured to receive a plurality of contemporaneous spread spectrum signal bursts from a denial of service attack in accordance with an embodiment of the present invention.

In one embodiment, a method is provided for protecting a receiver from a denial of service (DOS) attack, as depicted in the flow chart of FIG. 4. The receiver can be configured to receive a plurality of spread spectrum signal bursts from contemporaneous users. In one embodiment, the receiver can be configured to receive direct sequence spread spectrum code division multiple access (CDMA) signals. As discussed, the receiver can include a search engine and a plurality of burst receivers configured to receive a plurality of contemporaneous spread spectrum signals.

The method can include the operation of detecting a burst transmission, wherein the burst transmission includes a random burst number, as shown in block 410. The burst transmission can be detected using a search engine, such as an accumulated cross product search engine configured to detect a burst transmission and determine the transmission's frequency offset relative to a frequency reference at the receiver. The frequency offset can then be substantially removed from the burst transmission, enabling the burst number to be more easily detected.

The method further comprises the operation of analyzing the burst transmission to determine a denial of service statistic based on the pseudo-random burst number, as shown in block 420. As previously discussed, the burst transmission can be decoded and demodulated to determine the burst number. It can then be determined if a record and playback denial of service attack is underway by establishing whether the burst number on the received burst transmission has been received more often than is statistically probable within a certain time window. Alternatively, the system can be simplified by detecting the burst number using substantially less hardware and processing time. Simplification can be accomplished by recognizing a pattern in the burst transmission related to the burst number. While pattern recognition can increase the error rate of accurately detecting the burst number, the error rate can be brought to within reasonable levels by applying a block error correction code to the burst number prior to transmitting. A pattern of the encoded burst number at the receiver can then be detected and sent to a microprocessor. Alternatively, the block number can have the error correction code removed and the resulting pattern can be sent to a microprocessor, which can be used to compare the pattern with patterns in previously received burst transmissions.

An additional operation includes processing the burst transmission when the denial of service statistic is within a predetermined threshold, as shown in block 430. As previously discussed, when it is determined than the random burst number has not been received more that is statistically probable, the burst transmission associated with the burst number can be sent to a burst receiver. The relatively more computationally intensive tasks of a multi-user detector and forward error correction decoder can be applied to enable the data in the burst transmission to be retrieved. The receiver can also be used to double check and ensure that the burst number of each received burst is within statistical norms. If a statistically aberrant number of bursts having the same burst number are received, the bursts having that burst number can be flagged. The flagged bursts will not be sent to the burst receivers for a predetermined period of time, enabling the limited number of burst receivers to continue to be used to receive legitimate messages.

Placing a random or pseudo-random number within each burst transmission provides a relatively simple way to determine if a record and playback type denial of service attack is under way. In such a situation, the repeated playback of a specific burst, or a number of bursts, can be quickly detected. Detecting the burst transmission can be accomplished using an accumulated cross product (ACP) search engine. The ACP search engine can be used to substantially remove a frequency offset between the received burst transmission and a receiver frequency reference, enabling easier detection of the burst number in the burst transmission. Detection of the burst number in each burst transmission can be accomplished with a reduced amount of hardware and/or software by detecting the burst number pattern, rather than decoding and demodulating the burst number. This can increase the efficiency of the receiver and enable the receiver to defend against a greater number of packets sent in a denial of service attack.

The various embodiments disclosed in this application can be incorporated using one or more digital signal processors, field programmable gate arrays, complex programmable logic devices, application specific integrated circuits, and/or discrete components as can be appreciated.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for protecting a receiver from a denial of service attack wherein the receiver is configured to receive a plurality of contemporaneous spread spectrum signal bursts, the method comprising:

detecting a burst transmission with the receiver, wherein the burst transmission is a spread spectrum signal burst and includes a random burst number;

analyzing the burst transmission with the receiver to determine a denial of service statistic based on the random burst number; and processing the burst transmission with the receiver when the denial of service statistic is within a predetermined threshold.

2. A method as in claim 1, wherein detecting a burst transmission further comprises detecting a burst transmission that includes a pseudo-random burst number.

3. A method as in claim 1, wherein detecting a burst transmission further comprises detecting a burst transmission that includes a burst number located after a synch signal.

4. A method as in claim 1, further comprising determining the denial of service statistic based on a possible range of the random burst number.

5. A method as in claim 1, further comprising determining the denial of service statistic based on a potential number of the contemporaneous spread spectrum signal bursts that will be received within a predetermined period.

6. A method as in claim 5, further comprising setting the denial of service statistic at such a level that when more than two contemporaneous spread spectrum signal bursts having a matching burst number are received over a three second window, then subsequent bursts having the matching burst number will be inhibited from being assigned to a burst receiver.

7. A method as in claim 1, further comprising detecting a burst transmission using an accumulated cross product search engine configured to detect a presence and frequency offset of the burst transmission.

8. A method as in claim 7, further comprising de-rotating the burst transmission, wherein the burst transmission is de-rotated based on the frequency offset.

9. A method as in claim 1, further comprising inhibiting a burst receiver from being assigned a selected burst when the denial of service statistic is outside the predetermined threshold.

10. A method as in claim 1, further comprising assigning a burst receiver to a detected burst for a sufficient time for the burst receiver to identify the burst number and de-assigning the burst receiver if the denial of service statistic is outside the predetermined threshold.

11. A method as in claim 1, further comprising determining the burst number within the burst transmission using a sliding correlator.

12. A method as in claim 1, further comprising determining the burst number within the burst transmission using a matched filter correlator.

13. A method as in claim 1, further comprising encoding the burst number with a forward error correction block code to encode the burst number.

14. A method as in claim 1, wherein the random burst number is a randomly selected number for each spread spectrum signal burst.

15. A system for protecting a receiver from a denial of service attack wherein the receiver is configured to receive a plurality of contemporaneous spread spectrum burst signals, the spread spectrum burst signals comprising a random burst number located in each spread spectrum signal burst, the system comprising:

a component code despreader configured to despread at least one component code of each spread spectrum signal burst to form a signal burst;

a burst number decoder configured to recognize a pattern in the signal burst, wherein the pattern is related to the random burst number; and a microprocessor configured to compare the pattern to previously received patterns to form a denial of service statistic and send the signal burst to the receiver when the denial of service statistic is within a predetermined threshold.

16. A system as in claim 15, further comprising an accumulated cross product search engine configured to detect the plurality of contemporaneous spread spectrum signal bursts and to measure a frequency offset of the signal burst relative to a frequency reference at the receiver.

17. A system as in claim 16, further comprising a frequency shifter configured to de-rotate the signal burst by the frequency offset.

18. A system as in claim 15, wherein the burst number decoder further comprises a sync detector configured to detect a sync signal in the signal burst.

19. A system as in claim 18, wherein the burst number decoder further comprises a pattern detector configured to recognize the pattern related to the random burst number in each signal burst upon detection of the sync signal.

20. A system as in claim 19, wherein the pattern detector further comprises an error correction code decoder configured to remove a block forward error correction code from the burst number to form a decoded burst number signal.

21. A system as in claim 19, wherein the pattern detector further comprises a differential pattern detector configured to determine changes between samples of the signal burst to provide a differential pattern for each burst number.

22. A system as in claim 19, wherein the pattern detector further comprises a differential correlator configured to determine changes between samples of the signal burst to provide a differential pattern for each burst number.

23. A system as in claim 15, wherein the random burst number is a pseudorandom burst number.

24. A system as in claim 15, wherein the random burst number is a randomly selected number for each spread spectrum signal burst.

25. A receiver for receiving a plurality of contemporaneous spread spectrum signal bursts while protected from a denial of service attack, the receiver comprising:

a detection means for detecting a burst transmission, wherein the burst transmission is a spread spectrum signal burst and comprises a random burst number;

an analyzing means for analyzing the burst transmission to determine a denial of service statistic based on the random burst number; and a processing means for processing the burst transmission when the denial of service statistic is within a predetermined threshold.

26. A receiver as in claim 25, wherein the random burst number is a randomly selected number for each spread spectrum signal burst.

\* \* \* \* \*